US010235493B2

(12) United States Patent
Siegel et al.

(10) Patent No.: US 10,235,493 B2
(45) Date of Patent: Mar. 19, 2019

(54) SIMPLIFYING A COMPUTER-AIDED DESIGN MODEL WHILE RETAINING REFERENCES

(71) Applicant: Dassault Systemes SolidWorks Corporation, Waltham, MA (US)

(72) Inventors: Robert M. Siegel, Lexington, MA (US); Donald Van Zile, III, Macomb Township, MI (US)

(73) Assignee: Dassault Systemes SolidWorks Corporation, Waltham, MA (US)

(*) Notice: Subject to any disclaimer, the term of this patent is extended or adjusted under 35 U.S.C. 154(b) by 0 days.

(21) Appl. No.: 15/625,760

(22) Filed: Jun. 16, 2017

(65) Prior Publication Data

US 2017/0364628 A1    Dec. 21, 2017

Related U.S. Application Data

(60) Provisional application No. 62/351,644, filed on Jun. 17, 2016.

(51) Int. Cl.
*G06T 19/20* (2011.01)
*G06F 17/50* (2006.01)

(52) U.S. Cl.
CPC ...... *G06F 17/5086* (2013.01); *G06F 17/5004* (2013.01); *G06T 19/20* (2013.01); *G05B 2219/36319* (2013.01); *G06F 2217/02* (2013.01); *G06T 2210/36* (2013.01)

(58) Field of Classification Search
CPC ................ G06T 17/20; G06T 19/00

USPC ........................................................ 345/420
See application file for complete search history.

(56) References Cited

U.S. PATENT DOCUMENTS

| 2006/0250388 A1 | 11/2006 | Anderson et al. | |
| 2015/0317413 A1* | 11/2015 | Georgescu | G06F 17/50 703/1 |
| 2016/0314341 A1* | 10/2016 | Maranzana | G06F 17/50 |

FOREIGN PATENT DOCUMENTS

EP    2 560 112 A2    2/2013

OTHER PUBLICATIONS

David A Selliman, "Automated Geometry Simplification using 3D_Evolution™ for Multi-CAD application in a PLM system", Oct. 4, 2012.*

Gao S, Zhao W, Yang F, Chen X (2008) Feature suppression based CAD mesh model simplification. In: Proceedings IEEE international conference on shape modeling and applications, NY, Jun. 4-6.*

(Continued)

*Primary Examiner* — Jin Ge
(74) *Attorney, Agent, or Firm* — Hamilton, Brook, Smith & Reynolds, P.C.

(57) ABSTRACT

A computer-implemented method constructs a three-dimensional (3D) model, deletes data defining two or more features of the 3D model, and creates a new feature to replace the two or more features. Each of the two or more features has a set of faces, and a reduced amount of data is associated with the new feature with respect to the amount of data defining the two or more features. The method maps unique identifiers, enabling references to be retained and preventing a failure of an operation that uses the reference.

20 Claims, 7 Drawing Sheets

(56) References Cited

OTHER PUBLICATIONS

W. Quadros, S. Owen, Defeaturing CAD models using a geometry-based size field and facet-based reduction operators, in: Proceedings of the 18th International Meshing Roundtable, 2009, pp. 301-328.*

Satoshi Kanai, Yui Endo, Appearance preserving simplification of large scale assembly model by invisible part and form feature removal, Feb. 3, 2015.*

International Search Report and Written Opinion for Int'l Application No. PCT/US2017/037955, titled: Simplifying A Computer-Aided Design Model While Retaining References, dated Oct. 11, 2017.

David A Selliman: "Automated Geometry Simplification using 3D Evolution for Multi-CAD application in a PLM system" Oct. 4, 2012 (Oct. 4, 2012), pp. 1-3, XP055402958, Retrieved from the Internet: URL:http://images.connect2communities.com/pdf/ctrcorewhtppronautomatedgeometrysimplificationusing3devolutionformulticadtech4_1020121.pdf [retrieved on Aug. 31, 2017] pp. 1,2; figures 1,2; the whole document.

Iti International Technegroup: "Simplification of Large MCAD Equipment Models for Plant and Process", Jun. 11, 2016 (Jun. 11, 2016), XP855482971, Retrieved from the Internet: URL:https://web.archive.org/web/20168611874247/http://iti-global.com:80/uploadiMG/moxie/INF0%28SHEETS/CADfix.pdf [retrieved on 2817-88-31] the whole document.

* cited by examiner

SIMPLIFYING A COMPUTER-AIDED DESIGN MODEL WHILE RETAINING REFERENCES

RELATED APPLICATION(S)

This application claims the benefit of U.S. Provisional Application No. 62/351,644, filed on Jun. 17, 2016. The entire teachings of the above application(s) are incorporated herein by reference.

BACKGROUND OF THE INVENTION

Computer-aided design (CAD) software allows a user to construct and manipulate complex three-dimensional (3D) models. A number of different modeling techniques can be used to create a 3D model. One such technique is a solid modeling technique, which provides for topological 3D models where the 3D model is a collection of interconnected topological entities (e.g., vertices, edges, and faces). The topological entities have corresponding supporting geometrical entities (e.g., points, trimmed curves, and trimmed surfaces). The trimmed surfaces correspond to topological faces bounded by edges.

In general, a solid model consists of various features created by modeling operations. For example, a solid model may include a boss created by an extrude operation and a hole created by a cut operation. In addition to bosses and holes, features include fillets, shells, sweeps, and chamfers by way of non-limiting example.

CAD systems may combine solid modeling and other modeling techniques, such as parametric modeling techniques. Parametric modeling techniques can be used to define various parameters for different features and components of a model, and to define relationships between those features and components based on relationships between the various parameters. After a user has made a change to one or more parameters of the features, CAD systems may automatically rebuild a model from the features. Feature-based solid modeling allows for powerful editing capabilities during the design process, due in part to the inherent parametric characteristics.

A design engineer is a typical user of a 3D CAD system. The design engineer designs physical and aesthetic aspects of 3D models, and is skilled in 3D modeling techniques. The design engineer creates 3D parts and may assemble the 3D parts into a subassembly or an assembly. A subassembly may also consist of other subassemblies. An assembly is designed using parts and subassemblies. Parts and subassemblies are hereinafter collectively referred to as components.

A two-dimensional representation of a 3D model is commonly used to prepare and formally document the design of the 3D model. Such a representation is referred to as a drawing. To create a drawing, which may include annotations and dimensions, a CAD system may refer to the 3D part model and reference vertices, edges, and faces in the model to construct the drawing.

Many CAD systems construct history-based CAD models. In general, a history-based CAD model of a part is constructed by creating a base feature controlled by a two-dimensional sketch, which then may be extruded using, by way of non-limiting example, a revolve, a loft, or a sweep operation. Each subsequent feature of the CAD model is built on a previous feature, and therefore is dependent on a previously created feature. When the user edits a feature of the history-based model, the model is rolled back to a previous state, that is, the state prior to the creation of subsequent dependent features. History-based modeling systems typically store incremental operations between a previous step in the design process and a current step. These incremental operations may achieve higher performance levels for rollback, as well as roll forward and other operations in comparison to rebuilding the entire model from the beginning. However, storing all these incremental operations with a model still affects performance given that a 3D part may be quite complex (e.g., include 100 or more features), and a 3D model may be quite complex (e.g., include thousands of subassemblies).

Incremental operations may allow for faster speeds when editing a part model. However, for larger models, the incremental operations have a significant effect on the size of the model, which affects operations such as loading, saving, and overall memory usage. In addition, a big impact that many users see is the rebuild time of a large model, which can happen for a variety of reasons, not just when working on a part, but also when the part is included in an assembly or drawing.

Once the design is complete or during the design process, the user may want to reduce the amount of data stored in a 3D model to increase performance of a CAD system. Additionally, the user may wish to remove extraneous features from a model that are no longer necessary. The user may also wish to hide proprietary aspects of a 3D model before sharing the 3D model with others, and therefore, wish to remove certain features.

To remove design features, the prior art enables users to export a 3D part model to a neutral format that only contains the model's geometry then import the 3D part model back into the CAD system without the defining topological features. Thus, only the geometry defines the 3D part model. The disadvantage with this approach is that if an assembly or a drawing uses the 3D part model, the face, edge, and vertex references will fail and the user will need to repair the failures by laboriously redefining each reference. A further disadvantage is that an assembly model and/or a drawing model may be stored in files to which the owner of the 3D part may only have read-access. Therefore, the user may not be permitted to repair the failures. A system and method that allows simplification of a 3D model while overcoming these disadvantages would be a beneficial improvement over the current state-of-the-art.

SUMMARY OF THE INVENTION

In general, in one aspect, embodiments of the invention feature a computer-implemented method for simplifying a computer-aided design model. A three-dimensional (3D) model comprised of features is constructed using a computer-aided design (CAD). Date defining two or more features of the 3D model are deleted and a new feature is created to replace the two or more features, each of which are comprised of a set of faces. A reduced amount of data is associated with the new feature with respect to the amount of data defining the two or more features. Furthermore, unique identifiers identify one respective face in each of the set of faces and the method creates a mapping of the unique identifiers, which enables retention of an implemented reference to a referenced face that is included in the set of faces. The mapping prevents a failure of an operation that uses the referenced face and that is executed by the CAD system.

Other embodiments include a computer-aided design (CAD) system having a processor operatively coupled to a data storage system and a data storage memory operatively coupled to the processor. In such embodiments, the data storage system stores a three-dimensional (3D) model, and the data storage memory comprises instructions to configure the processor to construct a three-dimensional (3D) model, which is comprised of one or more features. The processor receives a command to specify two or more features (each having face entities) of the 3D model to be replaced by a new feature. A mapping of identifiers, each identifying a respective face, enables retention of an implemented reference to a referenced face in a replaced feature. The mapping prevents a failure of an operation that uses the referenced face. The new feature is created and replaces the two or more features, and a reduced amount of data is associated with the new feature with respect to an amount of data defining the two or more features.

Yet other embodiments include a non-transitory computer-readable data storage medium comprising instructions that cause a computer to construct a three-dimensional (3D) model comprised of one or more features, specify two or more features of the 3D model to be replaced by a new feature, create a mapping of identifiers, each of which identifies one respective face of the two or more features. The mapping enables retention of an implemented reference to one of the respective faces and prevents a failure of an operation that uses the referenced face and is executed by the CAD system. A new feature is created and replaces the two or more features. The new feature visually resembles the two or more feature. Moreover, a reduced amount of data is associated with the new feature with respect to an amount of data defining the two or more features.

Other aspects of the invention include deleting history data associated with the two or more features of the plurality of features when the 3D model is a history-based 3D model. Yet another aspect of the invention collects the unique identifiers in a data structure stored in computer memory and creating the mapping to locate, after deleting data defining two or more features, a respective identified face and/or a corresponding geometrical entity of the respective identified face. Another aspect of the invention assigns new identifiers to the new feature, the new identifiers cross-reference respective identifiers in the data structure. Other aspects of the invention include evaluating the implemented reference and dynamically translating the evaluated implemented reference to a corresponding identifier created for an entity of the new feature. In embodiments of the invention the implemented reference is a derived part reference, an assembly mate reference, a sketch reference, a drawing dimension reference, an annotation reference, a custom property reference, and a document setting reference.

The details of one or more embodiments of the invention are set forth in the accompanying drawings and the description that follows. Other features, objects, and advantages of the invention will be apparent from the description and drawings, and from the claims.

BRIEF DESCRIPTION OF THE DRAWINGS

The foregoing will be apparent from the following more particular description of example embodiments of the invention, as illustrated in the accompanying drawings in which like reference characters refer to the same objects throughout the different views. The drawings are not necessarily to scale, emphasis instead being placed upon illustrating embodiments of the present invention.

DETAILED DESCRIPTION OF THE INVENTION

The present invention addresses the problem that in a 3D CAD part with many features, the overhead to process all these features may be substantial. Additionally, the rebuilding of such a 3D CAD part and the 3D assembly model that includes the 3D CAD part and many other 3D CAD parts, can take a very long time. The present invention solves this problem by simplifying 3D models and portions thereof, and as a result, rebuilding a simplified model may be instantaneous.

The present invention simplifies a feature-based solid model and increases the performance of the CAD system by reducing the amount of data that is stored with the solid model, thereby reducing the amount of data used in CAD system operations and the amount of data that is managed by a CAD system. When simplifying a model the present invention removes features and associated history data (e.g., data specifying the order in which features are created and data storing incremental operations). With the removal of features, simplifying removes unique identifiers ("IDs") of the features' faces. These identifiers are used for referencing by various operations. To prevent operations from failing, the present invention maintains references that are needed by various operations, components, and drawings. Importantly, these references are frequently utilized in the computer processes that support a feature-based solid modeling system and/or surface modeling system.

The present invention creates a new feature to replace the removed features. The new feature also contains data to resolve references from other documents such as assembly and drawings documents, or references internal to the part document, e.g., colors. Face, edge, and vertex references are retained (later to be further discussed), which in turn maintain derived part references, assembly mate references, sketch references, drawing dimension and annotation references, custom property references, and document setting references, by way of non-limiting example.

Figure 1:
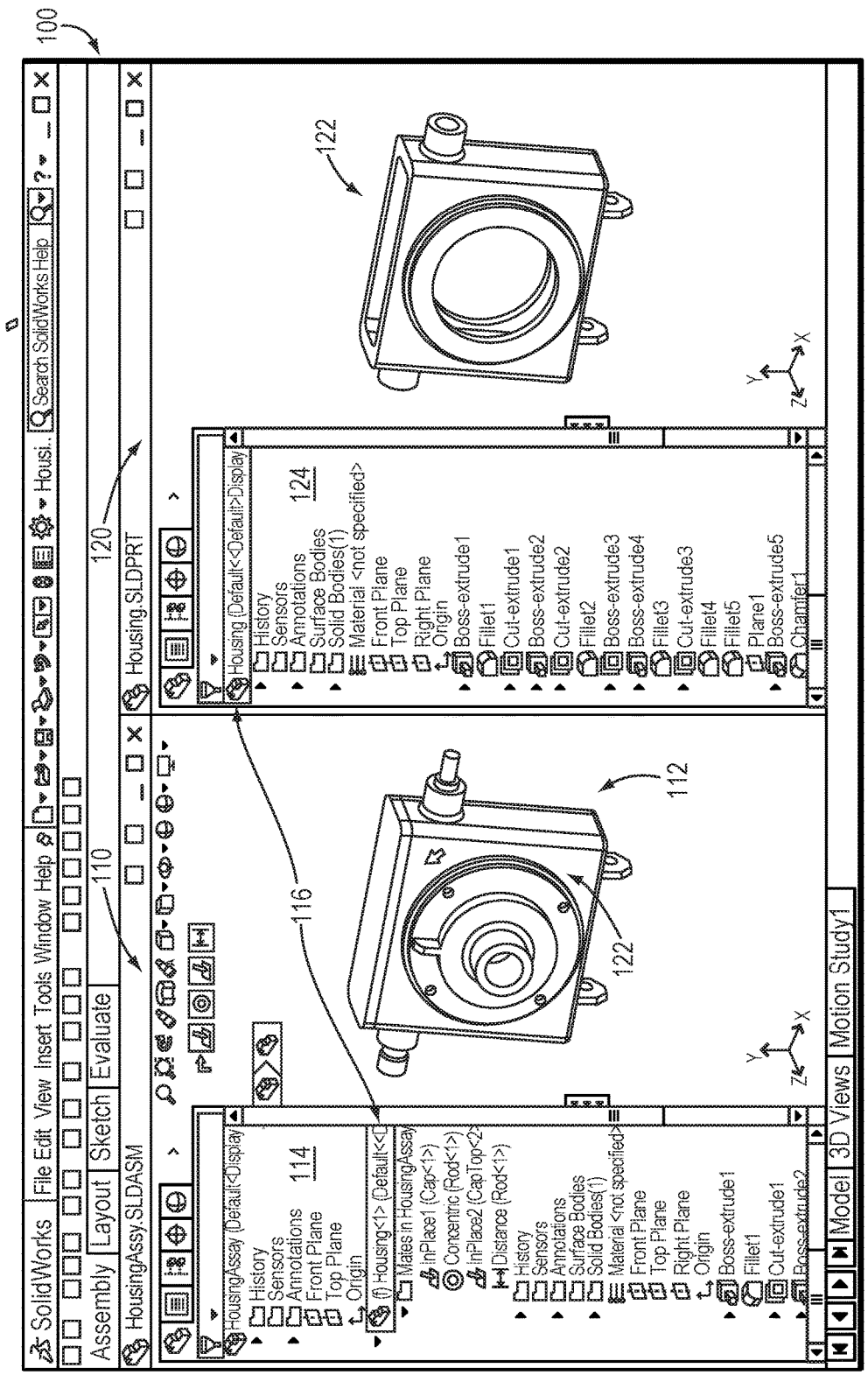
FIG. 1 is an illustration of an assembly and a part in an embodiment of the present invention.

Referring to FIG. 1, a split window 100 is illustrated. The left half 110 of the split window 100 shows an assembly 112 and a feature manager design tree 114. In the feature manager design tree 114 for assembly 112 is a part named Housing 116, which is a 3D part model 122 colored blue in the assembly 122. The right half 120 of the split window 100 shows the 3D part model 122 of the part named Housing. The Housing's feature manager design tree 124 lists the features in the 3D part model 122 and other attributes of the 3D part model 122. The features include (as indicated by the feature names) a number of fillets, bosses, and cuts, as well as a chamfer. As one can see, the 3D part model 122 is fairly complex.

Figure 2:
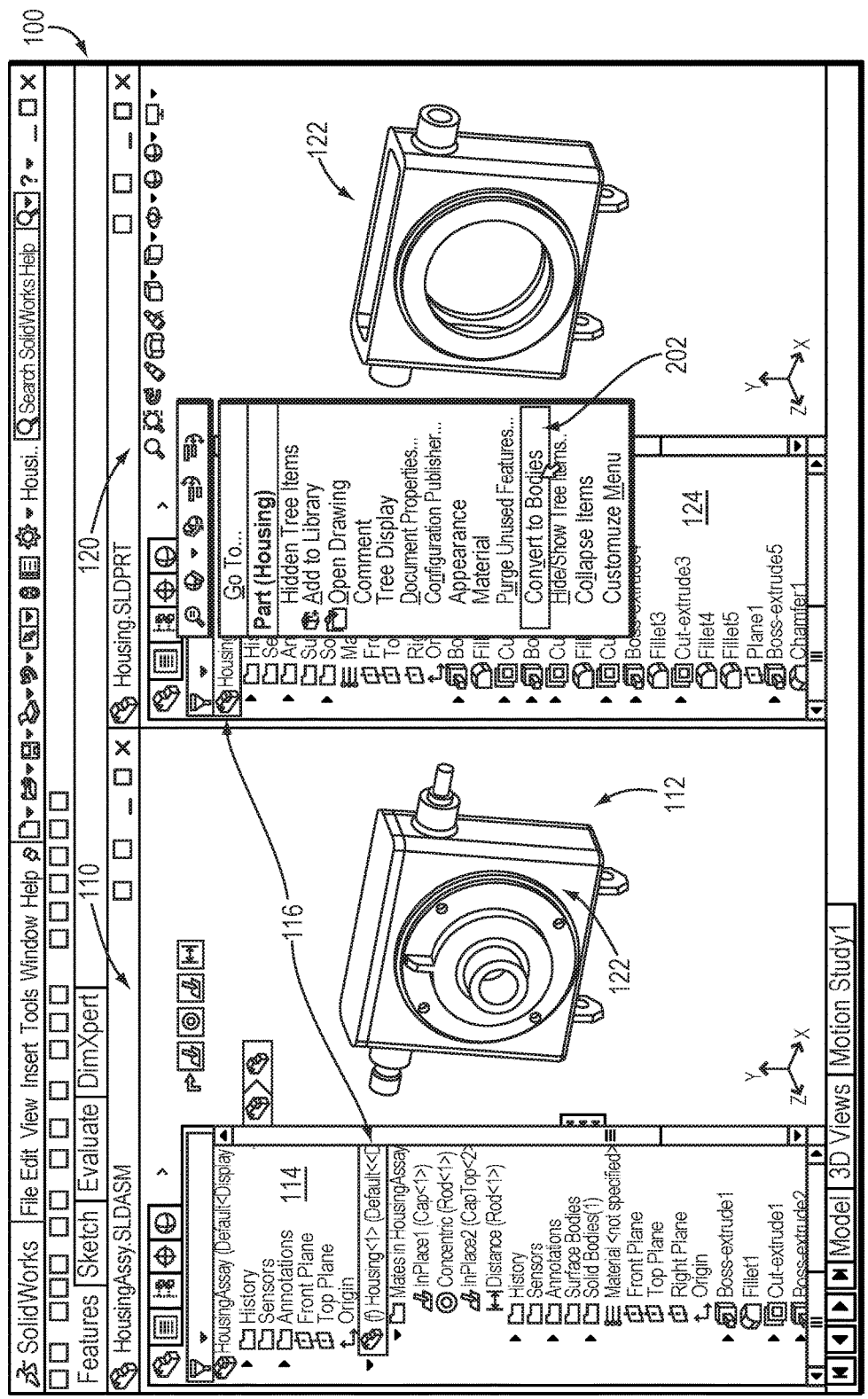
FIG. 2 is an illustration of an assembly and a part in an embodiment of the present invention.

FIG. 2 illustrates the beginning of a simplify process that simplifies a 3D model. In FIG. 2, a menu item 202 is selected by a user to initiate a conversion of the 3D model to a simplified model.

Figure 3:
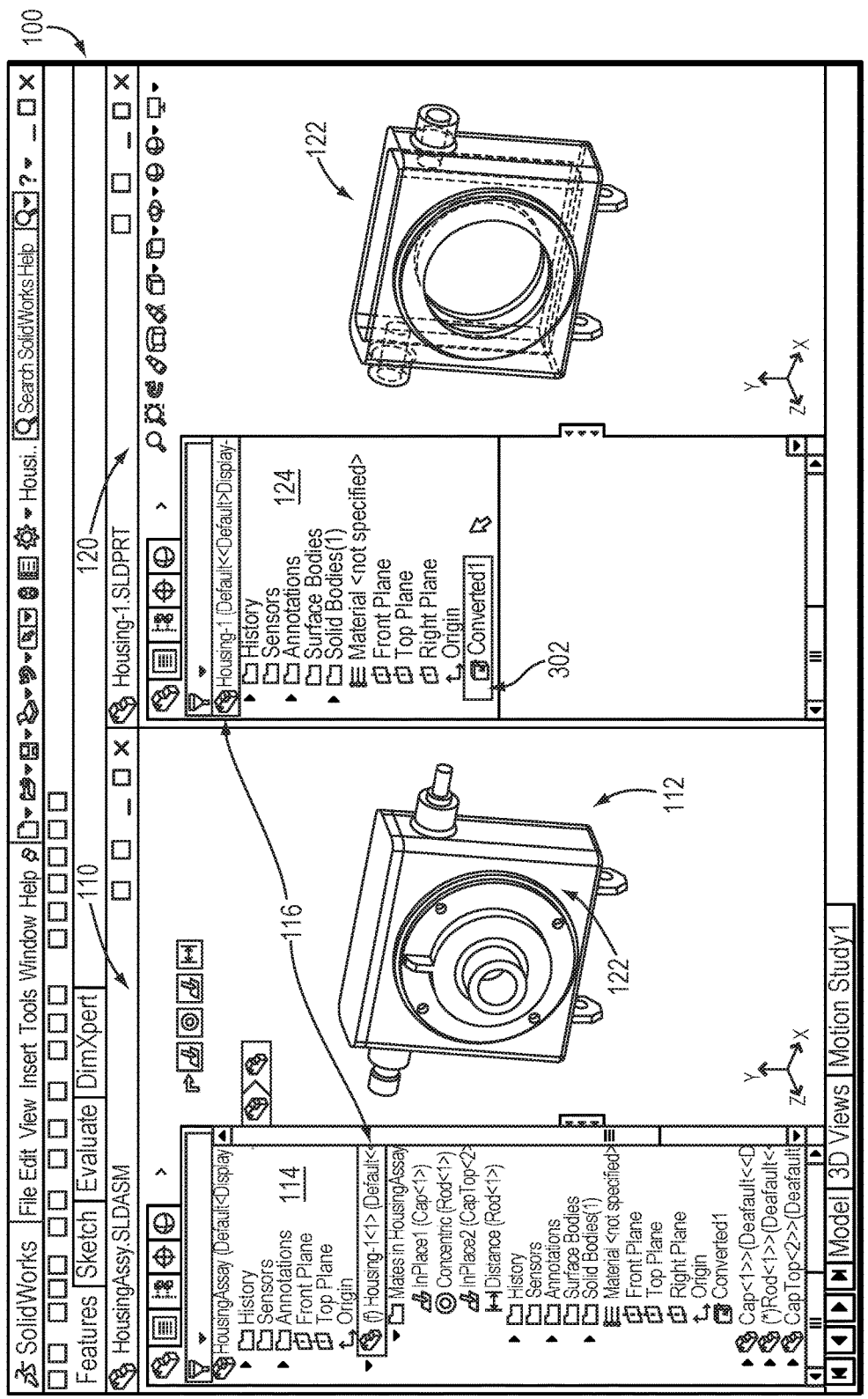
FIG. 3 is an illustration of an assembly and a part in an embodiment of the present invention.

FIG. 3 illustrates the result upon completion of the simplify process. The Housing part's feature manager design tree 124, which lists the features in the 3D part model 122, only lists a feature named Converted1 302. The feature named Converted1 302 replaced the many features for the 3D part model 122 (i.e., fillets, bosses, cuts, a chamfer, etc.) listed in the feature manager design tree 124 in FIGS. 1 and 2.

Figure 4:
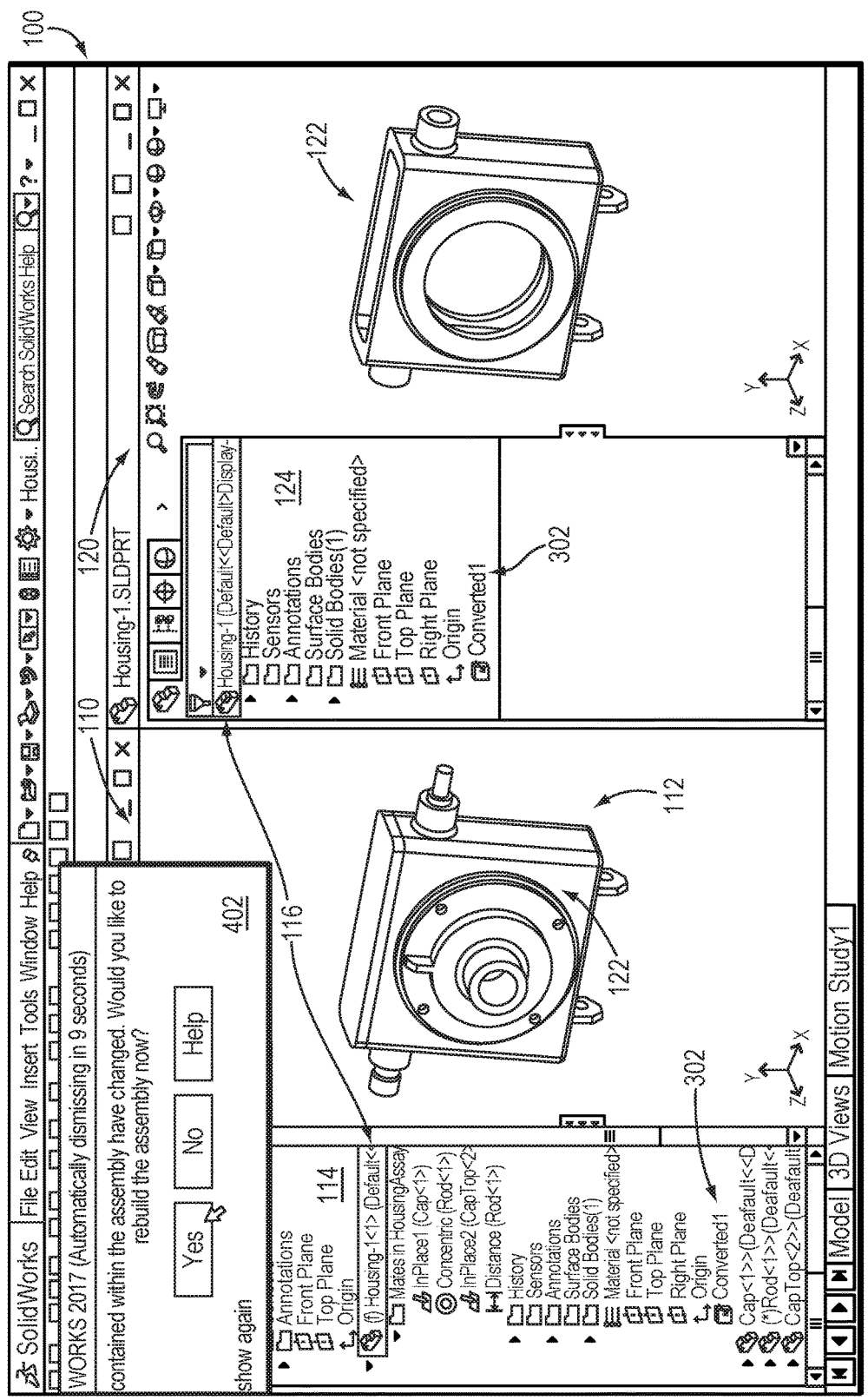
FIG. 4 is an illustration of an assembly and a part in an embodiment of the present invention.

FIG. 4 illustrates the end of the conversion process where a dialog 402 appears and notifies the user that features have been simplified (i.e., one feature replaced two or more features). The user may then select to rebuild the assembly 112 with the simplified 3D part model 122. When the user selects to rebuild the model, the list of features in the feature manager design tree 114 no longer list all the original features in 3D part model 122, but rather, lists the feature named Converted1 302 of the simplified 3D part model 122, which replaced all the original features.

In one embodiment of the present invention, each feature operation in the definition of a solid model and/or surface model assigns unique identifiers ("IDs") to the new faces created by the operation. The unique identifiers may then be used as references. Each face ID may be represented as a series of integers, although other representations such as strings may also be used. In an embodiment, each ID has at least two elements, one being a reference to the feature to which the face belongs and the second being a unique element assigned for each face created from the feature. The IDs are typically stored as attributes of the faces of a solid model and/or surface model.

Figure 5:
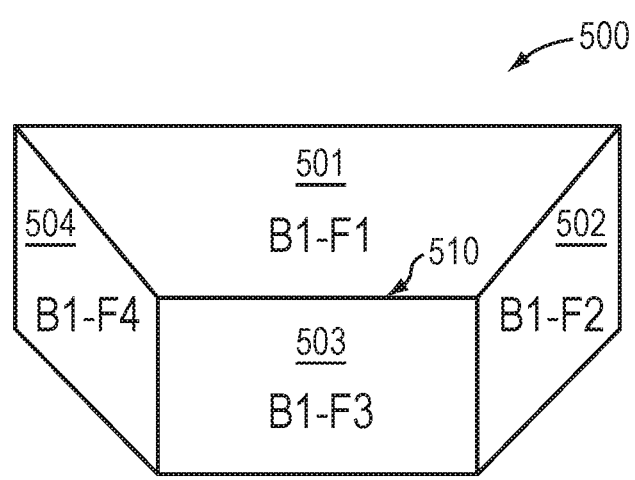
FIG. 5 is an illustration of a naming scheme in an embodiment of the present invention.

Referring now to FIG. 5, a representation of a feature 500 with assigned IDs is shown to illustrate a possible implementation of identifiers. The feature 500 may have been constructed by first creating a sketch of an outline of face B1-F1 (i.e., the face 501 having identifier B1-F1), then extruding that sketch downward by some amount. The extruded sketch in this example is feature 500, which is a boss feature and has the assigned ID of B1. The faces 501, 502, 503, 504 of feature 500 have IDs B1-F1, B1-F2, B1-F3, and B1-F4, respectively. The two hidden faces in feature 500—bottom and back faces—have been assigned IDs B1-F5 and B1-F6. Note that edge and vertex IDs can be derived easily from the face IDs. For example, the edge 510 between the top face 501 and the front face 503 may be assigned the ID Edge B1-F1/B1-F3. The IDs may be generated formulaically in terms of the features (e.g., an element of a pattern feature, the end or sides of an extrude feature, and a reference into a segment of a sketch) and not directly linked to the geometry of the 3D model.

The IDs are bi-directional. That is, given a feature the faces belonging to that feature may be located; and given a face, the feature to which the face belongs may be located. A simple use of this bi-directionality is that if a user selects a feature, the corresponding faces on the solid model may be highlighted. Similarly, if a user selects a face on the solid model the corresponding feature may be highlighted in the modeling area or in a list of features or other textual representations of features (e.g., in the FeatureManager® design tree available in SOLIDWORKS® software applications from Dassault Systemes SolidWorks Corporation of Waltham, Mass., examples of which are shown in FIGS. 1-4).

References to faces, edges, and vertices used by assemblies, drawings, or later created part features store copies of the respective face, edge, and/or vertex IDs. In an embodiment of the present invention, the face reference includes the referenced face ID along with the IDs of faces adjacent to the referenced face. Face IDs may also be stored to reference an edge or a vertex. An edge between two faces may be identified by the IDs of those two faces. A vertex may be identified by the IDs of the three faces that meet at the vertex.

Figure 6:
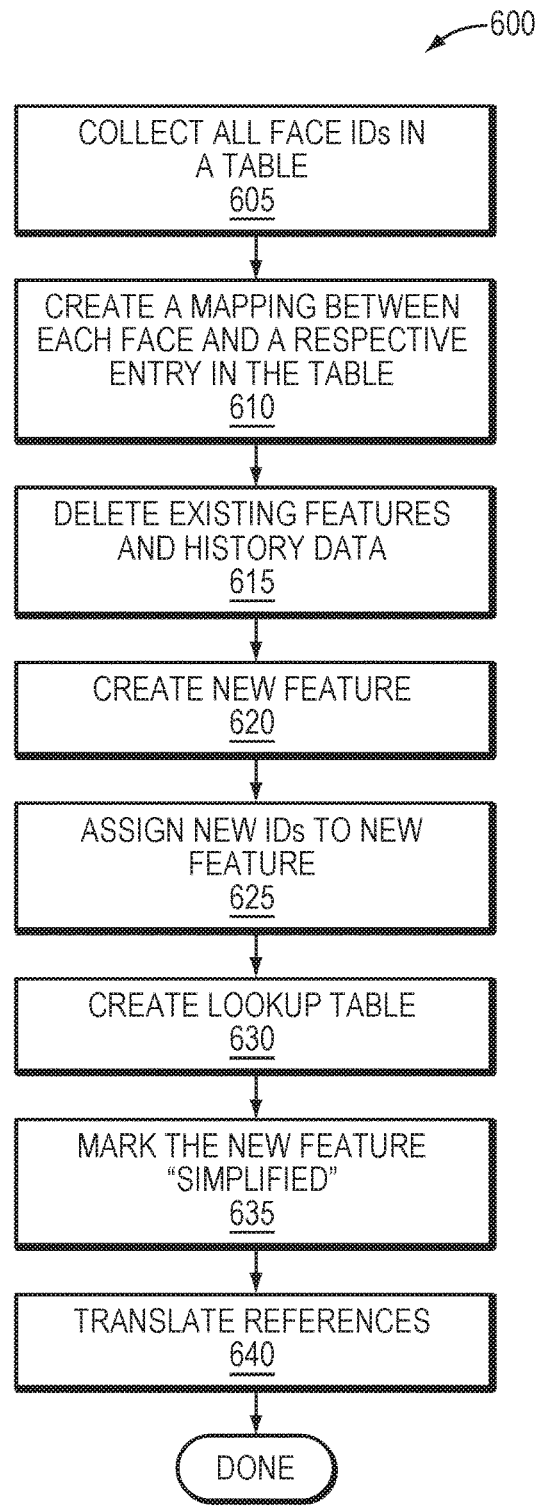
FIG. 6 is a flow diagram containing steps that simplify a model in an embodiment of the present invention.

Referring now to FIG. 6, a process 600 for simplifying a 3D part is shown as an example embodiment of the present invention. Before simplifying the 3D part, all existing face IDs of the 3D part are copied and saved in a table (step 605). A mapping is then created between each face of the 3D part and a row in the table associated with the ID for the respective face (step 610). The mapping may be just an index into the table. All the existing features of the 3D part are then deleted as is the associated history data of the 3D part (step 615), leaving the topology and geometry of the 3D part. In the next step, a single new feature is created containing the topology and the geometry generated from the original features along with all the mapping data enabling the conversion of the initial references to the new references (step 620). This mapping data allows for the automatic evaluation of the initial references from assemblies and drawings, for example, to find the intended faces, edges, and vertices during a rebuild operation. New IDs are assigned to the faces of the single new feature (step 625). In an example embodiment, a unique feature ID is created for the new feature and that unique feature ID and the index of the row in the table containing a given face ID forms the new ID for a corresponding face in the new feature. A fast lookup table (e.g., a hash table) is created that maps the old face IDs as represented in the stored table and each corresponding new face ID (step 630). Both the table containing the original face IDs and the fast lookup table are stored with the simplified feature so that references may be evaluated at any later point in time, for example, when an assembly or drawing document is opened which references the part model.

In the final step of process 600, the new feature is marked "simplified" (step 635). When process 600 is done, a single feature is created for all features in the 3D part. Process 600 may be repeated for various 3D parts in a 3D model, as indicated by a user.

Embodiments of the present invention also allow a 3D part to be partially simplified. These embodiments enable a user to indicate particular features in the 3D part to delete and from which to create a single new feature. When only some of the features are to be removed, the part model is rolled back to a previous state immediately preceding the state in which the last feature that is to be deleted was created. This previous state is also the state in which the first feature to be kept (i.e., not to be simplified) was created. After the rollback, the topology and geometry represent the 3D model generated by the features up to that point in the modeling history. Subsequent features are then deleted, a new simplified feature replaces those deleted features with new identifiers and a mapping is created as described herein. Additionally, the topology and the geometry is transferred to the new, simplified feature. The initial references in the remaining features are replaced by new references based on the mapping created in the simplified feature. Lastly, the features that have been retained are re-applied in order to generate the final model.

After the conversion of the part features (steps 605-635), process 600 translates the references in documents such as assembly and drawing documents that refer to the simplified part document. This translation occurs dynamically when the assembly or drawing document is opened by a user and loaded into memory. Therefore, the translation need not be done at the time the part is simplified, but can occur at any point after the simplification. Further, the translation does not require modification of the referencing document (i.e., an assembly or a drawing document). This is important because the owner of the part document may not have write/edit access to the other documents.

A number of extensions to the process 600 are possible. In an embodiment, multiple bodies in a 3D part model may be simplified. For example, a 3D part model comprised of two solid bodies may be simplified, and a 3D part model comprised of a solid body and a surface body may be simplified. Furthermore, embodiments of the present invention implement partial simplification of the features of a 3D part model, in which only some of the features are deleted, as has been discussed.

In embodiments of the present invention, downstream references to faces and edges do not fail so long as the new geometry type supports the reference. Furthermore, sketches on a planar face created from a feature do not fail (e.g., lose the plane on which the sketch depends) as long as the new face remains planar. Fillets on edges of the output geometry also do not fail. Moreover, sketch constraints on faces and edges of the output geometry, and reference geometry defined using the output geometry do not fail.

Figure 7:
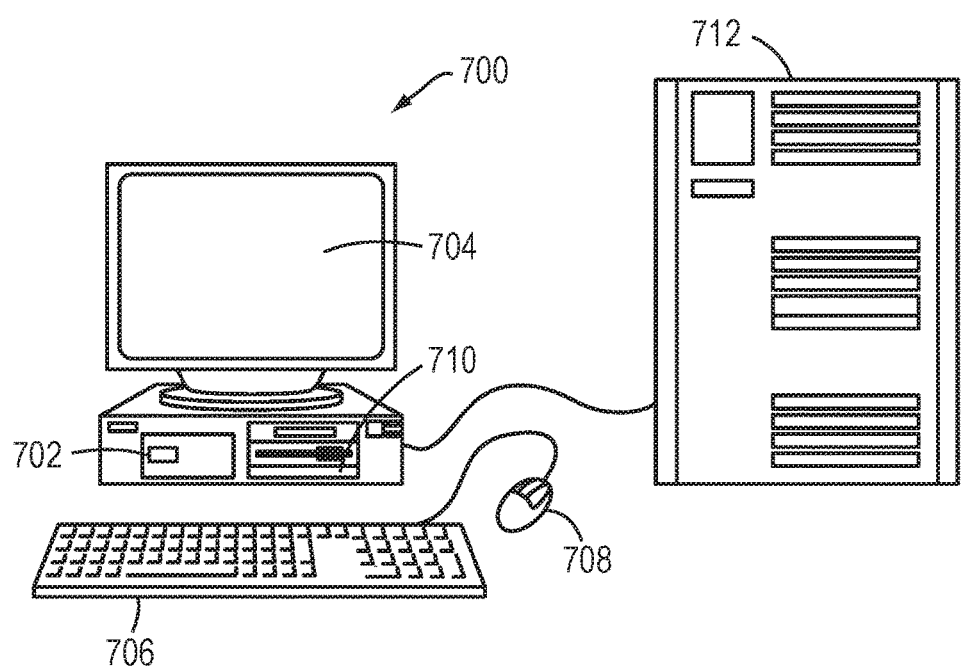
FIG. 7 is a schematic diagram of a computer system in which embodiments of the present invention may be implemented.

FIG. 7 illustrates a computerized modeling system 700 that includes a CPU 702, a computer monitor 704, a keyboard input device 706, a mouse input device 708, and a storage device 710. The CPU 702, computer monitor 704, keyboard 706, mouse 708, and storage device 710 can include commonly available computer hardware devices. For example, the CPU 702 can include an Intel-based processor. The mouse 708 may have conventional left and right buttons that the design engineer may press to issue a command to a software program being executed by the CPU 702. As an alternative or in addition to the mouse 708, the computerized modeling system 700 can include a pointing device such as a mouse, stylus, touch-sensitive pad, or pointing device and buttons built into the keyboard 706. Those of ordinary skill in the art appreciate that the same results described herein with reference to a mouse device can be achieved using another available pointing device. Other appropriate computer hardware platforms are suitable as will become apparent from the discussion herein. Such computer hardware platforms are preferably capable of operating the Microsoft Windows® 7 and Windows® 10, UNIX, Linux, or MAC OS operating systems.

Additional computer processing units and hardware devices (e.g., rapid prototyping, video, and printer devices) may be included in the computerized modeling system 700. Furthermore, the computerized modeling system 700 may include network hardware and software thereby enabling communication to a hardware platform 712, and facilitating communication between numerous computer systems that include a CPU and a storage system, among other computer components.

Computer-aided modeling software (e.g., process 600) may be stored on the storage device 710 and loaded into and executed by the CPU 702. The modeling software allows a design engineer to create and modify a 3D model and implements aspects of the invention described herein. The CPU 702 uses the computer monitor 704 to display a 3D model and other aspects thereof as described. Using the keyboard 706 and the mouse 708, the design engineer can enter and modify data associated with the 3D model. The CPU 702 accepts and processes input from the keyboard 706 and mouse 708. The CPU 702 processes the input along with the data associated with the 3D model and makes corresponding and appropriate changes to that which is displayed on the computer monitor 704 as commanded by the modeling software. In one embodiment, the modeling software is based on a solid modeling system that may be used to construct a 3D model consisting of one or more solid and surface bodies.

Embodiments of the invention may be implemented in digital electronic circuitry, or in computer hardware, firmware, software, or in combinations thereof. Apparatuses may be implemented in a computer program product tangibly embodied in a machine-readable storage device for execution by a programmable processor; and method steps may be performed by a programmable processor executing a program of instructions to perform functions by operating on input data and generating output. Embodiments of the invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; in any case, the language may be a compiled or interpreted language. Suitable processors include, by way of non-limiting example, both general and special purpose microprocessors. Generally, a processor will receive instructions and data from a read-only memory and/or a random access memory and in some embodiments instructions and data may be downloaded through a global network. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, custom-designed ASICs (application-specific integrated circuits).

Embodiments of the present invention or aspects thereof described herein may be implemented in the form of hardware, firmware, or software. If implemented in software the software may be stored on any non-transient computer readable medium that is configured to enable a processor to load the software or subsets of instructions thereof. The processor then executes the instructions and is configured to operate or cause an apparatus to operate in a manner as described herein.

Although the present invention is described in connection with an exemplary computer system environment, embodiments of the invention are operational with numerous other general purpose or special purpose computer system environments or configurations. The computer system environment is not intended to suggest any limitation as to the scope of use or functionality of any aspect of the invention. Moreover, the computer system environment should not be interpreted as having any dependency or requirement relating to any one or combination of components illustrated in the exemplary operating environment. Examples of computer systems, environments, and/or configurations that may be suitable for use with aspects of the invention include, but are not limited to, personal computers (PCs), server computers, hand-held and laptop devices, multiprocessor systems, microprocessor-based systems, set top boxes, programmable consumer electronics, mobile telephones and mobile operating systems, network PCs, minicomputers, mainframe computers, distributed computing environments that include any of the above systems or devices, and the like. The computer system may have standalone components or workstations, or the computer system may be formed of networked computers by any of known communications networks, processing networks, cloud-based networks, related protocols and the like.

As can be appreciated, the network can be a public network, such as the Internet, or a private network such as an LAN or WAN network, or any combination thereof and can also include PSTN or ISDN sub-networks. The network can also be wired, such as an Ethernet network, or can be wireless such as a cellular network including EDGE, 3G and 4G wireless cellular systems. The wireless network can also be WiFi, Bluetooth, or any other wireless form of communication that is known. Thus, the network is merely exemplary and in no way limits the scope of the present advancements.

Advantages of the present invention include making a 3D model smaller and faster to interact with, while alleviating a user from modifying the 3D model and associated drawing models to correct for invalid references. The full detailed geometric model is maintained, including the full geometric fidelity of the model, such as the mass properties, the full detail display, and the ability to reference any detailed geometry of the model. Additionally, the present invention may increase the performance of a CAD system since less data needs to be operated upon (e.g., during a rebuild operation).

Another advantage of the present invention is that a user may keep the internal design of the 3D model proprietary since the features used to construct the model need not be shown. In other words, the present invention allows for the elimination of propriety aspects of the model, which might be useful before the model is shared with third parties. The present invention also allows for the removal of information in a feature list, which creates a more orderly user interface area and thereby may increase user productivity.

Further advantages include alleviating the user from redoing and recreating downstream mates (i.e., mating relationships including references to simplified features), as well as all drawing dimensions and annotations since references are retained. Moreover, mass properties can be recomputed and will yield the same values as before the simplification of a 3D model. The same is true with other custom properties such as colors, as well as with document settings, which are also maintained.

A number of embodiments of the present invention have been described. Nevertheless, it will be understood by those skilled in the art that various modifications may be made within the boundaries of the invention. For example, embodiments of the present invention may change the order in which operations are performed. Furthermore, depending on the needs of an implementation, particular operations described herein may be implemented as a combined operation, eliminated, added to, or otherwise rearranged. For example, in an embodiment of the present invention, step 615 in FIG. 6 may only delete data indicative of the construction operations that created the features, such as, data indicating the construction of a feature by applying an extrude operation to a sketch.

What is claimed is:

1. A computer-implemented method for simplifying a computer-aided design model, the method comprising:
   constructing a three-dimensional (3D) model using a computer-aided design (CAD) system wherein the 3D model is comprised of a plurality of features;
   in response to user input, deleting data defining two or more features of the plurality of features and creating a new feature to replace the two or more features, wherein:
      each of the replaced two or more features is comprised of a set of faces; and
      a reduced amount of data is associated with the new feature with respect to the amount of data defining the replaced two or more features; and
   creating a mapping of a plurality of unique identifiers, each unique identifier identifying one respective face in each of the set of faces, wherein:
      the mapping enables retention of an implemented reference to a referenced face included in the set of faces of one of the replaced features, the mapping enables the retention by associating the new feature to the unique identifier identifying the referenced face of the one replaced feature; and
      the mapping prevents a failure of an operation that uses the referenced face of the one replaced feature and is executed by the CAD system, the mapping prevents the failure by enabling the operation to locate from the new feature the referenced face of the one replaced feature.

2. The computer-implemented method of claim 1, wherein:
   the 3D model is a history-based 3D model; and
   deleting data defining the two or more features of the plurality of features comprises deleting history data associated with the two or more features of the plurality of features.

3. The computer-implemented method of claim 1, further comprising:
   collecting the plurality of unique identifiers in a data structure stored in computer memory; and
   creating the mapping to locate after deleting data defining two or more features one or both of: (i) a respective identified face, and (ii) a corresponding geometrical entity of the respective identified face.

4. The computer-implemented method of claim 3, further comprising assigning new identifiers to the new feature, the new identifiers cross-referencing respective unique identifiers in the data structure.

5. The computer-implemented method of claim 1, further comprising:
   evaluating the implemented reference; and
   dynamically translating the evaluated implemented reference to a corresponding identifier created for an entity of the new feature.

6. The computer-implemented method of claim 1, wherein the new feature and the replaced two or more features are visually similar.

7. The computer-implemented method of claim 1, wherein the implemented reference is one member of a set of: (i) a derived part reference, (ii) an assembly mate reference, (iii) a sketch reference, (iv) a drawing dimension reference, (v) an annotation reference, (vi) a custom property reference, and (vii) a document setting reference.

8. A computer-aided design system comprising:
a processor operatively coupled to a data storage system, the data storage system storing a three-dimensional model; and
a data storage memory operatively coupled to the processor and comprising instructions to configure the processor to:
construct a three-dimensional (3D) model, wherein the 3D model is comprised of a plurality of features;
specify two or more features of the 3D model to be replaced by a new feature, wherein the replaced two or more features are each comprised of a set of faces;
create a mapping of a plurality of unique identifiers, each unique identifier identifying one respective face in each of the set of faces, wherein:
the mapping enables retention of an implemented reference to a referenced face included in the set of faces of one of the replaced features, the mapping enables the retention by associating the new feature to the unique identifier identifying the referenced face of the one replaced feature; and
the mapping prevents a failure of an operation that uses the referenced face of the one replaced feature and is executed by the CAD system, the mapping prevents the failure by enabling the operation to locate from the new feature the referenced face of the one replaced feature; and
create the new feature and replace the two or more features with the new feature, wherein a reduced amount of data is associated with the new feature with respect to an amount of data defining the replaced two or more features.

9. The computer-aided design system of claim 8, wherein:
the 3D model is a history-based 3D model; and
history data associated with the two or more features of the plurality of features is deleted from the 3D model.

10. The computer-aided design system of claim 8, further comprising instructions to configure the processor to:
collect the plurality of unique identifiers in a data structure stored in the data storage memory; and
create the mapping to locate after replacing the two or more features one or both of: (i) a respective identified face, and (ii) a corresponding geometrical entity of the respective identified face.

11. The computer-aided design system of claim 10, further comprising instructions to configure the processor to assign new identifiers to the new feature, the new identifiers cross-referencing respective unique identifiers in the data structure.

12. The computer-aided design system of claim 8, further comprising instructions to configure the processor to:
evaluate the implemented reference; and
dynamically translate the evaluated implemented reference to a corresponding identifier created for an entity of the new feature.

13. The computer-aided design system of claim 8, wherein the new feature and the replaced two or more features are visually similar.

14. The computer-aided design system of claim 8, wherein the implemented reference is one member of a set of: (i) a derived part reference, (ii) an assembly mate reference, (iii) a sketch reference, (iv) a drawing dimension reference, (v) an annotation reference, (vi) a custom property reference, and (vii) a document setting reference.

15. A non-transitory computer-readable data storage medium comprising instructions causing a computer to:
construct a three-dimensional (3D) model, wherein the 3D model is comprised of a plurality of features;
specify two or more features of the 3D model to be replaced by a new feature, wherein the replaced two or more features are each comprised of a set of faces;
create a mapping of a plurality of unique identifiers, each unique identifier identifying one respective face in each of the set of faces, wherein:
the mapping enables retention of an implemented reference to a referenced face included in the set of faces of one of the replaced features, the mapping enables the retention by associating the new feature to the unique identifier identifying the referenced face of the one replaced feature; and
the mapping prevents a failure of an operation that uses the referenced face of the one replaced feature and is executed by the CAD system, the mapping prevents the failure by enabling the operation to locate from the new feature the referenced face of the one replaced feature; and
create the new feature and replace the two or more features with the new feature, wherein:
the new feature visually resembles the replaced two or more features; and
a reduced amount of data is associated with the new feature with respect to an amount of data defining the replaced two or more features.

16. The computer-readable data storage medium of claim 15, wherein:
the 3D model is a history-based 3D model; and
history data associated with the two or more features of the plurality of features is deleted from the 3D model.

17. The computer-readable data storage medium of claim 15, further comprising instructions causing a computer to:
collect the plurality of unique identifiers in a data structure stored in a data storage memory; and
create the mapping to locate after replacing the two or more features one or both of: (i) a respective identified face, and (ii) a corresponding geometrical entity of the respective identified face.

18. The computer-readable data storage medium of claim 17, further comprising instructions causing the computer to assign new identifiers to the new feature, the new identifiers cross-referencing respective unique identifiers in the data structure.

19. The computer-readable data storage medium of claim 15, further comprising instructions causing a computer to:
evaluate the implemented reference; and
dynamically translate the evaluated implemented reference to a corresponding identifier created for an entity of the new feature.

20. The computer-readable data storage medium of claim 1, wherein the implemented reference is one member of a set of (i) a derived part reference, (ii) an assembly mate reference, (iii) a sketch reference, (iv) a drawing dimension reference, (v) an annotation reference, (vi) a custom property reference, and (vii) a document setting reference.

* * * * *